(12) United States Patent
Laurent

(10) Patent No.: US 7,561,702 B2
(45) Date of Patent: Jul. 14, 2009

(54) METHOD AND SYSTEM FOR THE PRE-PROCESSING AND POST PROCESSING OF AN AUDIO SIGNAL FOR TRANSMISSION ON A HIGHLY DISTURBED CHANNEL

(75) Inventor: Pierre André Laurent, Bessancourt (FR)

(73) Assignee: Thales, Paris (FR)

( * ) Notice: Subject to any disclaimer, the term of this patent is extended or adjusted under 35 U.S.C. 154(b) by 752 days.

(21) Appl. No.: 10/176,190

(22) Filed: Jun. 21, 2002

(65) Prior Publication Data

US 2003/0014244 A1 Jan. 16, 2003

(30) Foreign Application Priority Data

Jun. 22, 2001 (FR) .................................... 01 08279

(51) Int. Cl.
*H04H 20/47* (2006.01)
*H04H 20/88* (2006.01)
*H04H 40/36* (2006.01)
*H04B 15/00* (2006.01)

(52) U.S. Cl. .................... 381/94.3; 381/2; 381/94.1; 381/94.2

(58) Field of Classification Search ................ 381/94.1, 381/94.2, 94.3, 2; 704/226
See application file for complete search history.

(56) References Cited

U.S. PATENT DOCUMENTS

| | | | |
|---|---|---|---|
| 5,243,685 A | 9/1993 | Laurent | |
| 5,465,396 A * | 11/1995 | Hunsinger et al. | ............ 455/61 |
| 5,522,009 A | 5/1996 | Laurent | |
| 5,574,990 A | 11/1996 | Flanagan | |
| 6,016,469 A | 1/2000 | Laurent | |

FOREIGN PATENT DOCUMENTS

WO WO 98/06090 2/1998

OTHER PUBLICATIONS

Roch Lefebvre, et al., "Spectral Amplitude Warping (Saw) for Noise Spectrum Shaping in Audio Coding", International Conference on Acoustics, Speech and Signal Processing, 1997—ICASSP-97, 1997 Munich, Germany, Los Alamitos, CA, USA, IEEE Comput. Soc, US, Apr. 21, 1997, pp. 335-338.
R. Martinez, et al. "Combining Linear and Non-Linear Processing in the Time and in the Spectral Domain for Non-Sationary Noise Filtering", Proceedings of the IEEE-EURASIP Workshop on Nonlinear Signal and Image Processing (NSIP '99) Antalaya, Turkey, Jun. 20-23, 1999, vol. 2, pp. 598-602.
L. Hernández, et al. "A Continuous-Time Noise-Shaping Modulator for Logarithmic A/D Conversion", ISCAS '99, Proceedings of the 1999 IEEE International Symposium on Circuits and Systems VLSI (Cat. No. 99CH36349), Orlando FL, USA, May 30-Jun. 2, 1999, vol. 2, pp. 364-367.

* cited by examiner

*Primary Examiner*—Vivian Chin
*Assistant Examiner*—Douglas J Suthers
(74) *Attorney, Agent, or Firm*—Oblon, Spivak, McClelland, Maier & Neustadt, P.C.

(57) ABSTRACT

Method and system adapted to modifying an audio signal or speech signal comprising a step in which the frequency spectrum S(k) of the signal is converted by the application of a non-linear function. The method comprises at least the following steps: firstly, determining the signal level A(k), B(k) associated with a frequency k by taking account of different levels a(k), b(k) of the signal for the frequency k concerned and/or the neighboring frequencies (step 2a, step 8a); secondly, applying the non-linear function to said level A(k), B(k).

9 Claims, 4 Drawing Sheets

METHOD AND SYSTEM FOR THE PRE-PROCESSING AND POST PROCESSING OF AN AUDIO SIGNAL FOR TRANSMISSION ON A HIGHLY DISTURBED CHANNEL

BACKGROUND OF THE INVENTION

1. Field of the Invention

The invention relates to a method and system for the pre-processing and post-processing of audio or speech digital signals in order to maintain the quality of the signal at the highest possible level when there is a high noise level.

There is a major need to provide high-quality encoding and decoding systems, especially in the digital audio field. In applications such as videoconferencing, video telephony and multimedia applications, the audio signals need to be transmitted with high fidelity whatever the characteristics of the transmission channels.

2. Description of the Prior Art

In the system described in the patent application FR 2 815 492, also filed by the author of the present application and entitled "Radio broadcasting system and method providing continuity of service," the discrete complex values of the information cells which normally convey QAM digital information (a limited number of permitted values generally equal to a power of two) are replaced by continuous values representing analog samples of the original or pre-processed audio signal. The quality of the audio signals at output is practically constant whatever the precise configuration of the channel.

The quality, even in frequency-selective channels, is similar to the quality of amplitude modulation (AM) in a Gaussian type channel with a broadcast power that may be less than 1/10 of the power needed for true amplitude modulation, because no continuous carrier is transmitted.

This is due to the fact that the receiver carries out a (complex) gain compensation of the channel at each frequency and each point in time in such a way that, in theory, there is no variation of gain in the samples received.

It can be observed that the gain compensation especially has the following effect: in every case, the noise added to the samples received after the modulation has a flat frequency spectrum.

The noise is Gaussian with a simple channel and is varyingly impulsive with frequency-selective channels (channels comprising multiple propagation paths).

The patent application WO 98/06090 discloses a system and method implementing a non-linear transform on the signal in order to augment the perceptible quality of the audio or phonic signal. The non-linear transform is applied to each of the components Sk of the spectrum obtained after a windowing and Fourier transform step.

SUMMARY OF THE INVENTION

The system and method according to the invention propose a novel approach in which the processing operations are performed no longer in considering the components of the spectrum at a given frequency k but in taking account of a value derived for example from a mean or a smoothing operation around this frequency.

The invention proposes a system relying especially on the following three principles:

1—the signal to be transmitted is an audio signal intended for the human ear (speech, music, etc), 2—the frequency spectrum of the noise at the output of the demodulator is always flat, even if it is not Gaussian, when the propagation channel has multiple paths or is subjected to scrambling, 3—the ear works as a bank of filters that covers the entire range of useful frequencies. If, at a given frequency (or for neighboring frequencies), the noise has lower power than the audio signals, then only the useful audio signals are detected (this is the mask effect).

The object of the invention is a method to modify an audio or speech signal comprising at least one step in which the frequency spectrum $S(k)$ of the signal is converted by the application of a non-linear function, said non-linear function being applied to a signal level $A(k)$, $B(k)$ determined by taking account of different levels $a(k)$, $b(k)$ of the signal for the frequency k concerned and/or the neighboring frequencies (step 2a, step 8a).

The step 2a is performed for example before the transmission of the signal and the step 8a after the reception of the signal.

The processing operations at transmission and the processing operations at reception may be performed synchronously on signal sections having a one-to-one correspondence with each other.

The method comprises for example a step for the pre-accentuation of the audio signal at transmission, designed to give it a long-term frequency spectrum parallel to that of the reception noise and a step for the de-accentuation of the audio signal at reception.

For example, as a non-linear function, it implements the logarithmic function and the steps 2a and 8a may be carried out by smoothing the signal levels.

The invention also relates to a system for the pre-processing and post-processing of an audio or speech signal, wherein the transmitter and/or the receiver comprise at least one means adapted to:

determining the signal level $A(k)$, $B(k)$ associated with a frequency k in taking account of the different levels $a(k)$, $b(k)$ of the signal for the frequency k concerned and/or the neighboring frequencies (step 2a, step 8a), applying a non-linear function to said level $A(k)$, $B(k)$.

It comprises for example an FIR type filter at the transmitter and the receiver. This filter may have positive coefficients.

The transmitter comprises for example a device for the pre-accentuation of the audio signal before it is transmitted and the receiver comprises a device for the de-accentuation of the audio signal.

The receiver may comprise a noise-clipping device.

In particular, the invention has the following advantages:

by combining the pre-processing and post-processing operations, an frequency spectrum of the noise is obtained, this frequency spectrum, which is originally flat, being modified in such a way that:
  at the frequencies at which the audio signal is strong, the noise level is augmented,
  at the frequencies at which the signal level is weak, the noise level is reduced.

The noise level is modified (increased or decreased) so that it remains below the useful signal for practically all the frequencies. This considerably augments the subjective quality of the audio signal, even if the total noise power is modified unpredictably.

Since the ear has "logarithmic" sensitivity (the intensity of the signal perceived at a given frequency is varyingly proportional to the logarithm of its real intensity), the main purpose of the pre-processing and post processing operations will be to correspondingly modify the logarithm of the intensity of the signal at each frequency or sub-frequency of the audio signal at the transmitter and then at the receiver.

BRIEF DESCRIPTION OF THE DRAWINGS

Other features and advantages of the invention shall appear more clearly from the following detailed description of an embodiment, given as a non-restrictive example and illustrated by the appended figures, of which.

MORE DETAILED DESCRIPTION

Figure 1:
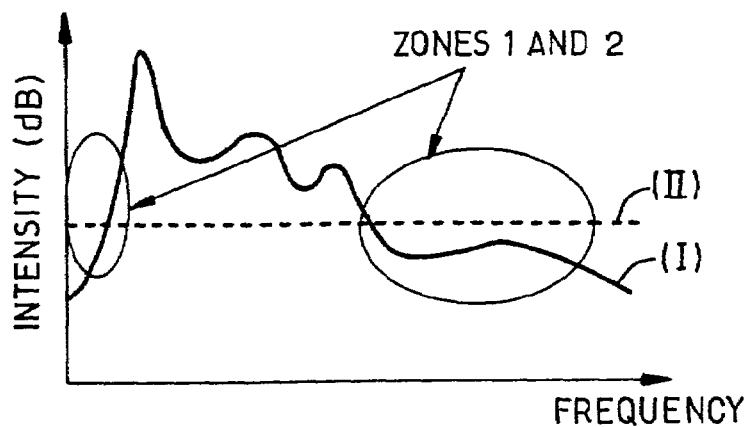
FIG. 1 shows the frequency spectra of the useful audio signal and of the noise at reception.

FIG. 1 is a graph of the intensity of the signal expressed in dB (on the y-axis depicted in a logarithmic scale) and the frequency given in Hz (on the x-axis) representing the frequency spectrum of the original or useful audio signal (curve I) and that of the noise at reception (stray signal) (curve II) obtained in prior art transmission systems. It is noted that for frequencies where the audio signal is weak (zones 1 and 2 in FIG. 1), the noise is clearly perceptible, thus leading to deterioration in audio quality.

Figure 2:
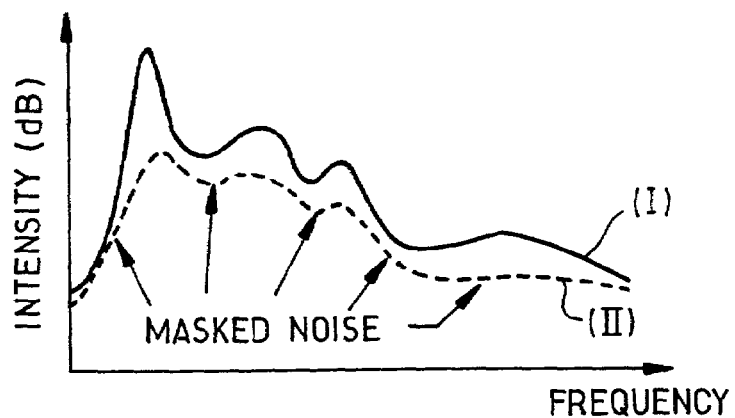
FIG. 2, shows the frequency spectra desired for the signals of FIG. 1.

FIG. 2 gives a diagrammatic view, in a reference system identical to that of FIG. 1, of the frequency spectra of the useful audio signal and of the noise at reception, as they would have to be in order to obtain practically perfect quality for the audio signal.

The curve I representing the audio signal has a level that is always higher than that of the curve II representing the spectrum of the noise at reception. The noise is "masked" throughout the frequency band considered. This leads to high perception quality: the noise is masked at all frequencies, even if its total power is the same as that of the noise whose spectrum is given by the curve II of FIG. 1.

The object of the invention relates to a system and a method whose goal in particular is to obtain the results illustrated by the curves of FIG. 2. The signal considered maybe an audio or phonic (speech) signal.

The system chosen draws inspiration from techniques well known to those skilled in the art as "noise shaping" and used in low-bit-rate vocoders but uses these techniques in a manner different from that of the vocoders. It is divided into two parts:

Transmitter Side
  a pre-processing of the useful audio signal modifying the spectral composition of the audio signal transmitted in such a way that the mean frequency spectrum in time is approximately flat, i.e. "parallel to the spectrum of the noise generated on the receiver side after demodulation.

Receiver Side
  a two-step post-processing operation on the receiver side:
    a cleaning of the signal designed to eliminate the noise peaks (when the noise is no Gaussian)
    a modification that is inverse to and substantially identical to the frequency spectrum of the audio (+noise), in order to have an audio signal with the same (or substantially the same) frequency spectrum as the non-processed signal.

The audio signal or speech signal concerned in the present invention has a structure known to those skilled in the art and will therefore not be used.

Transmitter
  On the transmitter side, the method according to the invention comprises, for example, the following steps:

Step 1: Spectral analysis
  A spectral analysis is carried out on the initial audio signal, for example by using a Fast Fourier Transform (FFT) with windowing and partial overlapping.

The quality of the final result depends on the size N of the FFT used, the shape of the window and the degree of overlapping. A possible choice, for a sampling frequency of 8 to 10 KHz, would lie for example in the use of an FFT of N=200 to 300 points, a Blackman-Harris type window with four terms and a quarter-window progression between two iterations. Other choices are possible and are dictated by a compromise between quality and complexity.

Step 2: Computation of the variation in gain
  2a—for each frequency k=0 . . . N/2, computing the level a(k) of the audio signal, a(k) being for example the square of the modulus of the complex value S(k) of the spectrum of the audio signal at this frequency. The idea of the invention consists especially of the application of a step for taking the average of the level a(k) of the signal for a given frequency k and at this frequency in order to execute the following steps of the method according to the invention on a smoothed value referenced A(k). For example the level determined for a given frequency k may be the weighted mean of the levels of the signal at the frequencies k−1, k and k+1.

This step executed from the transmitter side is used to obtain the best possible reconstitution of the original signal on the receiver side, it being known that, on the receiver side, the step gives adequate quality when there is a high noise level.

2b—computing the approximate logarithm of this level $L(k)=\log(A_0+A(k))$ to take account of the <<logarithmic>> sensitivity of the ear, where $A_0$ is a very small positive constant designed to prevent the problems of computation, 2c—modifying this logarithm L(k) by using a simple linear conversion of the $L'(k)=L_0+a(L(k)-L_0)$ type where $L_0$ is the reference level deduced from the averaged power of the input signal and "a" is a constant multiplier coefficient smaller than 1 (for example 0.5), 2d—modifying the signal level at a frequency (or a group of frequencies) k, so that its logarithm becomes L'(k), by applying to S(k) a real gain g(k) equal to exp(0.5(L'(k)−L(k))), for example, which does not modify the phase of the components of the spectrum, and converts S(k) into S'(k)=g(k) S(k). The factor 0.5 comes from the fact that g(k) is a gain in amplitude, while the values of L(k) are computed from the power values a(k) or A(k).

Step 3: returning to the time signal in using, for example, a reverse Fourier transform $FFT^{-1}$, a window and an overlap operation corresponding for example to those used in the step 1); this procedure is known to those skilled in the art as the "overlap-and-add" procedure.

Figure 4:
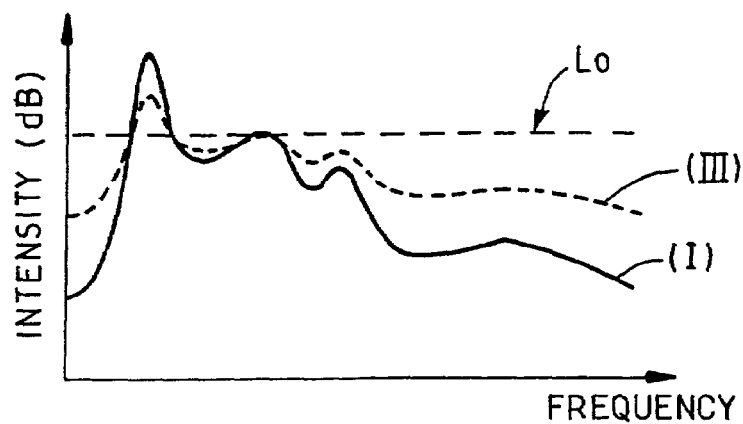
FIGS. 4 and 5 show the frequency spectra of the useful audio signal transmitted.

The frequency spectrum of the useful audio signal obtained at the end of the step 3 is represented by the curve III of FIG. 4.

Step 4: in the temporal field, carrying out a pre-accentuation in order to augment the audio signal level for the high frequencies. The pre-accentuation is done, for example, by using a filter with the following form:

$$H(z)=(1+G)/(1+Gz^{-1})$$

taking G to be in the range of 0.7 for example for a sampling frequency in the range of 8 to 10 KHz.

This step gives a frequency spectrum that is as flat as possible in the long term.

Figure 5:
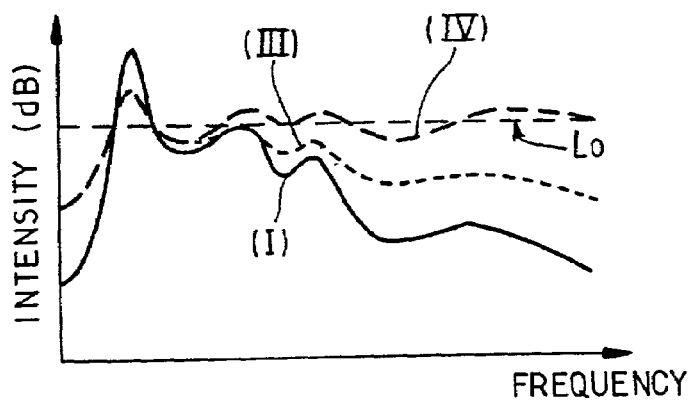

The curve IV of FIG. 5 shows the effect of the pre-accentuation step on the curve III of FIG. 4, which leads to a modification solely of the level of the high frequencies.

The steps of the method described here above can be achieved by the installation of a software program in the transmitter or by modifying the electronic devices forming the transmitter.

Figure 3:
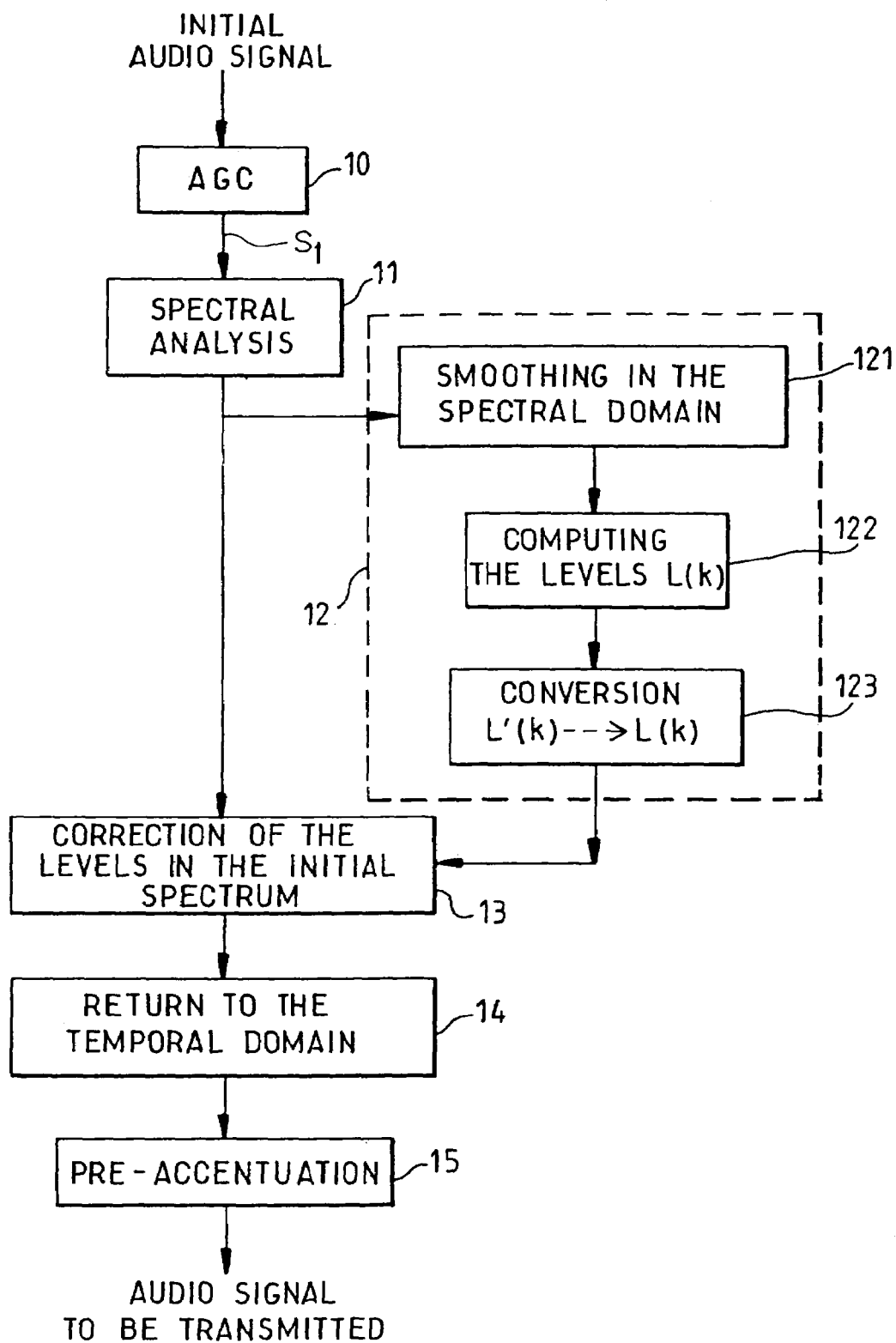
FIG. 3 is a block diagram of the different steps at transmission according to the invention.

FIG. 3 gives a schematic view, in the form of a simplified block diagram, of the different elements of the pre-processing unit of the encoder device, used to execute the above-mentioned steps 1 to 4.

The useful audio signal $S_o$ is transmitted to:

An automatic gain control (AGC) system 10 whose function, in particular, is to limit the dynamic range of the audio signal at input in order to obtain an averaged power value that is practically constant in time (over a major duration), and that gives the signal $S_1$.

Thus, from the transmitter side, the average power of the cells containing the analog samples is the same as the power that ought to exist in the original all-digital system. This gain regulation is also carried out if the reference level $L_0$ of the audio signal is constant or varies slowly. The averaged power after the AGC must be proportional to $L_0$.

A device 11 whose function is to analyze the spectrum of the useful audio signal $S_1$ coming from the AGC system 10, in using for example a Fast Fourier Transform (FFT) with windowing and overlapping.

The windowing and the overlapping enable the signal to be reconstructed as perfectly as possible with a coefficient a=1, without aliasing or artifacts.

A device 12 to compute the gain modification which derives S'(k) from S(k). This device 12 comprises, for example, a device 121 used to compute the level a(k) and smoothen it in the frequency domain to obtain A(k), a device 122 to compute levels L(k), the step 2b), a device 123 enabling the conversion of L(k) into L'(k), step 2c).

The device 121 in particular has the function of obtaining a smoothed version of the spectrum of the audio signal $S_1$. The device 121 is for example a Finite Impulse Response (FIR) filter adapted to obtaining a measured value A(k) which is, for example, in practice, a linear combination of the real values a(k), a(k+/−1), a(k+/−2) etc.

A device 13 adapted to modifying the modulus or amplitude of the components of the initial frequency spectrum S(k), in taking account of the difference L'(k)−L(k) between the logarithms of the smoothed levels before and after transformation.

A temporal reconstruction system 14 based on a reverse Fourier Transform and on the <<overlap-and-add>> procedure.

A device 15 to pre-accentuate the signal in the time domain which gives the final samples that will be distributed in the in-phase and quadrature components of the free data cells of the transmitted frame (they replace the initial QAM cells).

According to one alternative embodiment of the system, the pre-accentuation can be done directly in the frequency domain, in replacing L'(k) by L'(k)+dL(k), where dL(k) is a constant increasing the gain according to the frequency k.

Receiver

Figure 7:
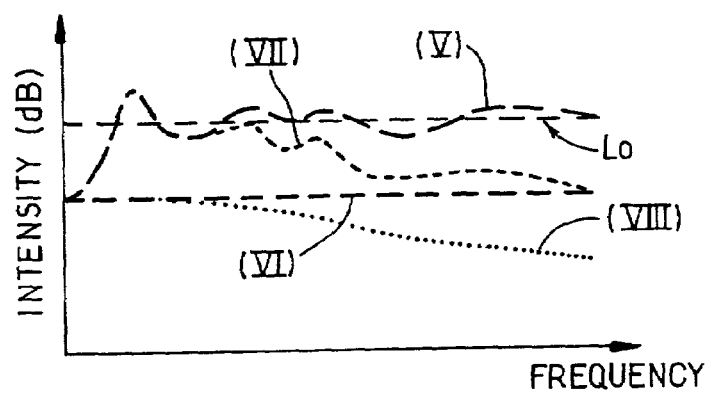
FIGS. 7 and 8 show the frequency spectra of the useful audio signal and of the noise at reception.

At reception, the method comprises for example the following steps:

Step 5: clipping the noise pulses, the spectra of the useful signal and of the noise at reception are represented by the curves V and VI given in FIG. 7.

Step 6: de-accentuation: de-accentuating the signal by using the inverse of the filter used at the transmitter, 1.e, 1/H(z), step 4.

The frequency spectra of the useful signal and of the noise obtained are represented in FIG. 7 by curves referenced VII and VIII respectively.

Step 7: analysis of the signal: carrying out the analysis of the signal in the frequency domain (for example the same or substantially the same analysis as the one made at the transmitter, namely by using the same FFT size, N, substantially the same window of analysis and substantially the same overlap); this analysis must give, discounting the reception noise, the reception noise, the components S'(k) of the frequency spectrum of the signal modified at transmission.

Step 8

8a—For each frequency (or group of frequencies) k, computing the smoothed level B(k), in a manner similar to that of the step 2b) by smoothing the signal b(k) which is the square of the module of S'(k), for example by considering a weighted mean of the values b(k) in the neighborhood of the frequency k, 8b—computing the logarithm of this signal level L'(k)=log ($A_0$+B(k)) for each frequency k, 8c—modifying this logarithm by using the inverse of the simple linear transform used on the transmitter side (a and $L_0$ have the same values as those used during transmission) which leads, for the example given in the step 2c) to L"(k)= $L_0$+(1/a) (L'(k)−$L_0$), 8d—modifying the signal level at the frequency (or group of frequencies) k, in order to convert its logarithm into L"(k); this amounts to the application to S'(k) of a real gain equal to g'(k)=exp(0.5(L"(k)−L'(k))), again without modifying the phases of the components, to obtain S"(k)=g'(k) S'(k) which, if the reconstitution were to be perfect, would be equal to S(k).

Step 9—Returning to the temporal signal according to the same method as that used with the transmitter.

Figure 8:
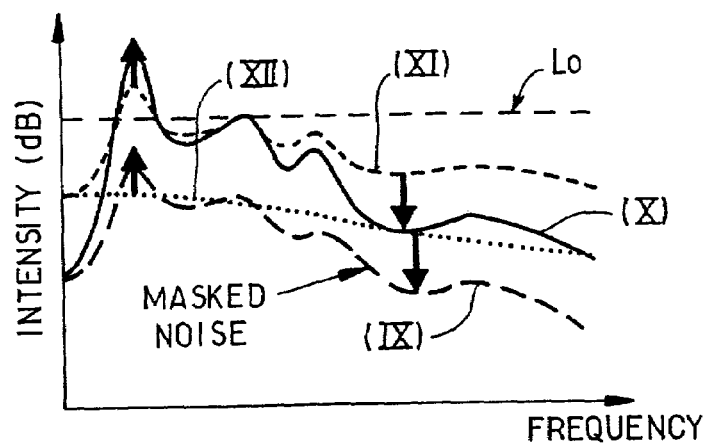

FIG. 8 shows the different curves resulting from the different processing steps. It can be seen that the noise level, curve IX, is below the level of the useful signal, the curve X, throughout the frequency domain considered. The curves XI and XII respectively correspond to the audio signal and to the noise level received after the de-accentuation step.

It can be seen that the post-processing similarly modifies (increases or reduces) the spectral components of the signal and of the noise: it does not modify the local signal-to-noise ratio (SNR). This SNR must be as high and uniform as possible throughout the audio bandwidth. Since the reception noise, but not the audio signal, shows a long-term flat spectrum, this provides a posteriori justification for the use of the pre-accentuation and the de-accentuation.

The pre-processing and post-processing operations may be and are preferably totally synchronized. This is obtained when each frame of the transmitted signal contains an exact number of audio frames because the receiver then knows exactly which sample of the initial signal is present in each of the cells: this increases the quality of the output signal, since the levels L'(k) in the receiver are exactly the same as the levels in the transmitter, and are not intermediate values obtained by a form of interpolation, for which the reconstruction would be of lower quality.

Figure 6:
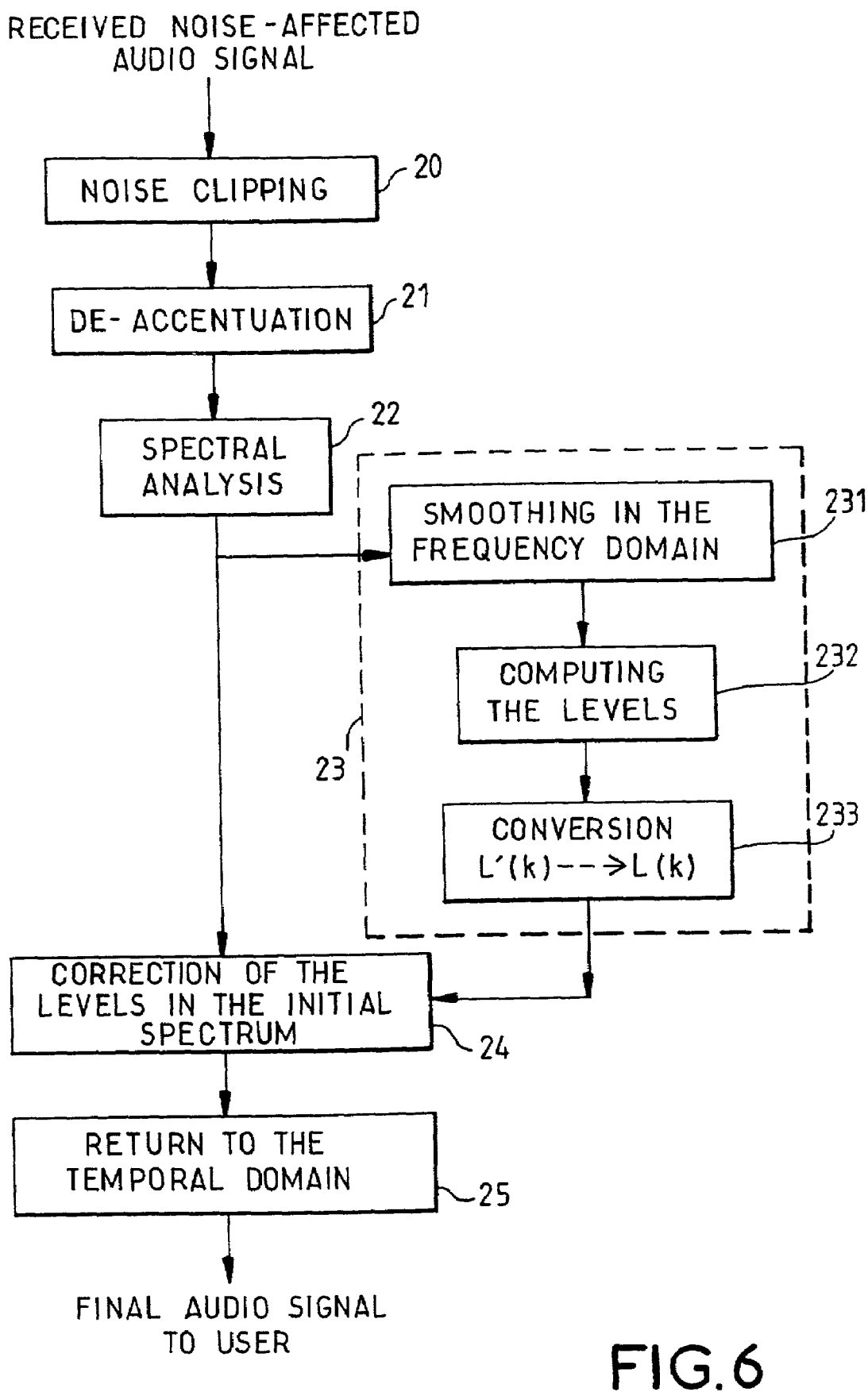
FIG. 6 is a block diagram of the different steps at reception.

An exemplary receiver architecture for executing the steps 5 to 8 of the method is given in FIG. 6.

The components of the system or of the software are, for example, the following:

- an adaptive clipping system 20 that eliminates the noise peaks when their distribution is not Gaussian. This system may, for example, evaluate a short-term RMS value (root-mean-square value) of the input signal and eliminate (zero-set or clip) the samples for which the absolute value of the amplitude is greater than K times the RMS value. The value of K may be estimated heuristically, in taking account of the statistical properties of the audio signal (Laplace distribution in a first approximation). A value of 5 to 8 may be used.
- A de-accentuation device 21 which provides exact compensation for the pre-accentuation made at the transmitter.
- A spectrum analysis device 22 which may be the same as the one (11) used in the transmitter.
- A device 23 comprising a device 231 to carry out a smoothing of the signal level values according to the step 8a), a device 232 to compute the levels L'(k) (step 8b) and a device 233 to convert the value L'(k) into a value L"(k) (step 8c).
- A device 24 to modify the amplitudes of the components in the frequency domain of the initial frequency spectrum in taking account of the differences L"(k)−L'(k) for a given value k.
- A time domain signal reconstruction system 25 which may be the same as the device 14 used in the transmitter.

According to one alternative embodiment of the system, the device 231 may carry out the de-accentuation (elimination of the device 21) directly in the frequency domain by modifying the level L'(k) at the frequency k by a quantity equal to −dL(k), where dL(k) is the same gain increase constant as that of the transmitter.

For low signal-to-noise ratio values, the individual levels measured L'(k) are not exactly the same as in the transmitter because the noise has been added to the useful signal.

Since the noise samples (in the frequency domain) are independent at the frequencies k and k+n (whatever n may be), an FIR type low-pass filter is used to obtain a smoothed version of the spectrum of the amplitudes of the signal.

For example, if the level computed for the frequency k corresponds to a mean value of the levels of the signal for the frequencies k−1,k, k+1, the effect of the noise is three times less, i.e., the error made in the estimation of B(k) (from which L'(k is deduced)) is three times smaller than in the smoothing step, thus leading to an appreciably lower deterioration of the subjective quality.

The smoothing filters S(z) used at the transmitter and the receiver must naturally be identical to have the best possible reconstitution of the original audio signal. For example, for a smoothing that uses the frequencies k−3, ... k+3, it is possible to obtain the signal level B(k) at the frequency k from the non-smoothed signals b(k) by using the filter F(z) given by:

$$F(z)=(z^3+6z^2+15z+20+15z^{-1}+6z^{-2}+z^{-3})/64$$

Or, more explicitly:

$$B(k)=(b(k+3)+6b(k+2)+15b(k+1)+20b(k)+15b(k-1)+6b(k-2)+b(k+3))/64$$

The noise reduction is equal to 924/4096, which corresponds approximately to −6.5 dB with this filter.

Of course, the smoothing can use a different low-pass filter F(z), or again be implemented by means that are more indirect but equally efficient. One of these means consists, for example, in carrying out the reverse Fourier transform of the levels b(k), to obtain self-correlation r(k), which is multiplied by a coefficient $\gamma^k$ with $\gamma$ below 1 and on which a Fourier transform is carried out to directly obtain the values of B(k).

According to a very general condition, the filter F(z) (or its equivalent depending on the method used) has coefficients that are all strictly positive in order to prevent the values of A(k) at transmission or the values of B(k) at reception from becoming negative or zero.

The use of the smoothing operation especially has the effect wherein, even without noise, the reconstruction of the spectrum is imperfect if the theoretical relationships between L(k), L'(k) and L"(k) are used as described here. Different (but complex) known relationships could be used to obtain perfect reconstruction, but would lead to a final audio signal that is paradoxically of lower subjective quality.

However, experience shows that, under normal conditions of use (medium or low signal-to-noise ratio), this low distortion is imperceptible because it <<follows>> the spectrum of the audio signal, and is masked by the noise.

What is claimed is:

1. A method to modify an audio or speech signal comprising:
    converting the audio or speech signal into a frequency spectrum S(k);
    applying a non-linear function to at least one of a signal level A(k) representing an amplitude function of S(k) by a transmitter device and a signal level B(k) representing an amplitude function of S(k) by a receiver device, wherein
    the step of applying the non-linear function to signal level A(k) is performed before the transmission of the signal and the step of applying the non-linear function to signal level B(k) is performed after the reception of the signal,
    said signal level A(k) and signal level B(k) are based respectively on discrete amplitudes a(k) at the transmitter and discrete amplitudes b(k) at the receiver for frequency k and neighboring frequencies in signal level A(k) and signal level B(k),
    application of the non-linear function to A(k) and B(k) modifies noise in the audio or speech signal such that noise in the audio or speech signal follows the audio or speech signal in frequency dependence across the frequency spectrum S(k);
    pre-accentuation of the audio signal at transmission to provide a long-term frequency spectrum parallel to that of reception noise,
    de-accentuation of the audio signal at reception,
    applying the non-linear function and pre-accentuation and de-accentuation steps results in the obtaining of a frequency spectrum of the noise;
    wherein, the frequency spectrum, which is originally flat, is modified in such a way that at the frequencies at which the audio or speech signal is strong, the noise level is augmented and at the frequencies at which the audio or speech signal is weak, the noise level is reduced,
    whereby the noise level is modified so that the noise level remains below the useful signal for practically all frequencies, even if total noise power is modified unpredictably.

2. A method according to claim 1, wherein the processing operations at transmission and the processing operations at reception are performed synchronously on signal sections having a one-to-one correspondence with each other.

3. A method according to claim 1, comprising a step for the clipping of the noise pulses at reception before the dc-accentuation step.

4. A method according to claim 1, wherein a logarithmic function is used as the non-linear function.

5. A method according to claim 1, further comprising: smoothing the levels a(k), b(k).

6. A system for the pre-processing and post-processing of an audio or speech signal, comprising:
   a transmitter and a the-receiver configured to:
   convert the audio or speech signal into a frequency spectrum S(k);
   apply a non-linear function to at least one of a signal level A(k) representing an amplitude function of S(k) at the transmitter and a signal level B(k) representing an amplitude function of S(k) at the receiver, wherein
   application of the non-linear function to signal level A(k) is performed before the transmission of the audio or speech signal and application of the non-linear function to signal level B(k) is performed after the reception of the audio or speech signal,
   said signal level A(k) and signal level B(k) are based respectively on discrete amplitudes a(k) at the transmitter and discrete amplitudes b(k) at the receiver for frequency k and neighboring frequencies in signal level A(k) and signal level B(k), and
   application of the non-linear function to signal level A(k) and signal level B(k) modifies noise in the audio or speech signal such that noise in the audio or speech signal follows the audio or speech signal in frequency dependence across the frequency spectrum S(k),
   pre-accentuation of the audio or speech signal at transmission to provide a long-term frequency spectrum parallel to that of the reception noise,
   de-accentuation of the audio or speech signal at reception,
   applying the non-linear function and pre-accentuation and de-accentuation results in the obtaining of a frequency spectrum of the noise;
   wherein, the frequency spectrum, which is originally flat, is modified in such a way that at the frequencies at which the audio or speech signal is strong, the noise level is augmented and at the frequencies at which the audio or speech signal is weak, the noise level is reduced,
   whereby the noise level is modified so that the noise level remains below the useful signal for practically all frequencies, even if total noise power is modified unpredictably.

7. A system according to claim 6, comprising an FIR filter at the transmitter and the receiver.

8. A system according to claim 7, wherein the filter has positive coefficients.

9. A system according to claim 6 wherein the receiver comprises a noise-clipping device.

* * * * *